United States Patent [19]
Baba et al.

[11] Patent Number: 4,802,746
[45] Date of Patent: Feb. 7, 1989

[54] VARIABLE-FOCUS OPTICAL ELEMENT AND FOCUS DETECTING DEVICE UTILIZING THE SAME

[75] Inventors: Takeshi Baba, Atsugi; Shigeyuki Suda, Tokyo; Noriyuki Nose, Sagamihara; Eigo Kawakami; Toshiyuki Nakajima, both of Atsugi; Nobuo Kushibiki, Ebina, all of Japan

[73] Assignee: Canon Kabushiki Kaisha, Tokyo, Japan

[21] Appl. No.: 832,649

[22] Filed: Feb. 25, 1986

[30] Foreign Application Priority Data

Feb. 26, 1985 [JP]   Japan .................................. 60-36770
Apr. 16, 1985 [JP]   Japan .................................. 60-80863

[51] Int. Cl.$^4$ .............................................. G02B 3/14
[52] U.S. Cl. .................................. 350/418; 250/201; 350/419; 350/423
[58] Field of Search ........................... 350/418, 419; 250/201 PF

[56] References Cited
U.S. PATENT DOCUMENTS 4,289,379  9/1981  Michelet ............................. 350/419
4,631,394 12/1986  Horikawa ....................... 250/201 PF
4,639,588  1/1987  Shinoda ......................... 250/201 PF

FOREIGN PATENT DOCUMENTS 1327503  8/1973  United Kingdom ................. 350/419

Primary Examiner—John K. Corbin
Assistant Examiner—Rebecca D. Gass
Attorney, Agent, or Firm—Fitzpatrick, Cella, Harper & Scinto

[57] ABSTRACT

A variable focus optical element comprises plural elastic members superposed in the axial direction and a deforming member having an aperture to cause the elastic member to protrude therefrom or descend therein thereby deforming the surface of the elastic members, and the modulus of elasticity of an elastic member at the protruding side is selected larger than that of another elastic member adjacent to first-mentioned elastic member at the protruding side. A focus detecting device comprises an imaging optical system having a variable-focus optical element, an image sensor provided at a determined image plane of the imaging optical system or an optically equivalent position, a sharpness detecting device for detecting the sharpness of the image from image signals obtained from the image sensor, and a device for varying the refractive power of the variable-focus optical element, and the focus state of the image on the image sensor is detected by comparing the sharpnesses detected by the sharpness detecting device at plural refractive powers of the variable-focus optical element.

21 Claims, 7 Drawing Sheets

VARIABLE-FOCUS OPTICAL ELEMENT AND FOCUS DETECTING DEVICE UTILIZING THE SAME

BACKGROUND OF THE INVENTION

1. Field of the Invention

The present invention relates to an optical element with a variable focal length and in particular to a focus detecting device equipped with such optical element.

2. Related Background Art

There are already proposed various variable-focus lenses, for example a lens composed of an elastic container of which shape is variable by the pressure of liquid filled therein, such as disclosed in the Japanese Patent Laid-open No. 36857/1980, or a lens utilizing a piezoelectric element such as disclosed in the Japanese Patent Laid-open No. 110403/1981 or 85415/1983. However, the former so-called liquid lens cannot be made compact as it requires a liquid reservoir and a pressurizing device, and is associated with deformation of surface by gravity or vibration. On the other hand, the later lens has a limited variable range of the focal length.

Figure 1A:
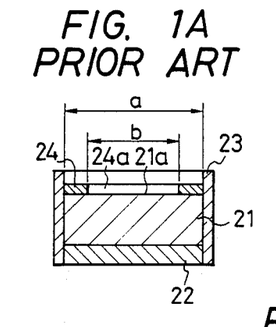
FIGS. 1A and 1B are cross-sectional views of an already proposed optical element.
Figure 1B:
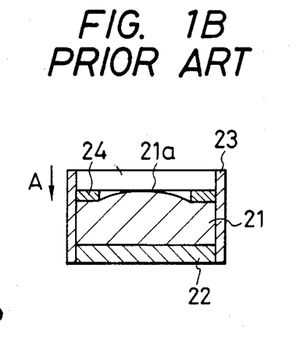

In order to overcome these drawbacks, the present inventors already proposed a variable-focus lens as shown in FIG. 1, comprising a transparent elastic member 21, a glass plate 22, a lateral wall 22, and an aperture plate 24 having an aperture 24a. 21a indicates the surface of the elastic member 21 in the aperture 24a of the aperture plate 24.

FIG. 1A shows an initial state before deformation, wherein the surface 21a of the elastic member in the aperture 24a has a determined molded form such as a plane or a spherical surface. When the aperture plate 24 is moved in a direction A, as shown in FIG. 1B, to press the elastic member 21, whereby the elastic member 21 protrudes from the aperture 24a and the surface 21a of the elastic member 21 in the aperture 24a assumes a more strongly curved state than in FIG. 1A. Consequently said surface 21a can be utilized as a variable-focus lens surface. This structure is advantageous in providing a large variable range of focal length with a small dimension and with a small external force.

In order to adapt the element shown in FIG. 1 into an actual optical system, it is necessary to select the diameter b of the aperture, shown in FIG. 1, as close as the diameter a of the element, thereby minimizing the optically uneffective portion other than the lens surface and thus compactizing the entire optical system.

However, though the surface 21a of the elastic member deforms in a spherical form when the diameter b of the aperture is sufficiently smaller than the diameter a of the element, there appears a drawback of significantly aspherical deformation in the surface 21a with a stronger curvature in the peripheral area thereof in case the diameter b of the aperture becomes closer to the diameter a of the element. In this case the deformation of the elastic member 21 depends solely on Poisson's ratio but not on the elastic modulus. Consequently the form of the elastic member 21 is deformed state remains also the same regardless of the material thereof. It has not, therefore, been possible to obtain, with the conventional structure, a desired surface form with a small structure regardless of the material employed.

SUMMARY OF THE INVENTION

In consideration of the foregoing, an object of the present invention is to provide a variable-focus optical element capable of always maintaining a spherical or aspherical surface form.

Another object of the present invention is to provide a focus detecting device with an improved response utilizing the characteristics of said variable-focus optical element.

The first-mentioned object can be achieved, according to the present invention, by a variable focus optical element comprising plural elastic members superposed in the axial direction and a deforming member having an aperture to cause said elastic member to protrude therefrom or descend therein thereby deforming the surface of said elastic members, wherein the modulus of elasticity of an elastic member at the protruding side is selected larger than that of another elastic member adjacent to the first-mentioned elastic member at the protruding side.

Also the above-mentioned other object can be achieved, according to the present invention, by a focus detecting device comprising an imaging optical system having a variable-focus optical element, an image sensor provided at a determined image plane of said imaging optical system or an optically equivalent position, sharpness detecting means for detecting the sharpness of the image from image signals obtained from said image sensor, and means for varying the refractive power of said variable-focus optical element, wherein the focus state of the image on said image sensor is detected by comparing the sharpnesses detected by said sharpness detecting means at plural refractive powers of said variable-focus optical element.

Still other objects of the present invention will become fully apparent from the following description of the embodiments.

BRIEF DESCRIPTION OF THE DRAWINGS

FIGS. 7A, 7B, 7C and 7D are cross-sectional views showing an example of manufacturing process of the variable-focus optical element of the present invention, wherein

DETAILED DESCRIPTION OF THE PREFERRED EMBODIMENTS

Figure 2:
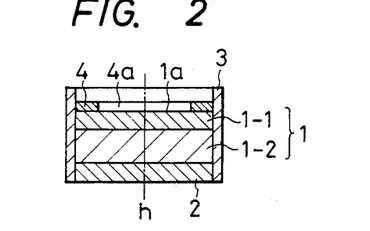
FIG. 2 is a cross-sectional view of an embodiment of the variable-focus optical element of the present invention.

FIG. 2 shows, in a cross sectional view, an embodiment of the present invention, which is different from the structure shown in FIG. 1 in that the elastic member 1 is composed of two elastic members 1-1, 1-2 of different moduli of elasticity. More specifically, in a container consisting of a bottom plate 2 and a lateral wall 3, composed for example of glass, there is provided a transparent elastic member 1 which is composed of a first elastic member 1-1 and a second elastic member 1-2 laminated in the direction of optical axis h. Above said elastic member 1 there is provided an aperture plate 4, functioning as a deforming member for deforming the elastic member 1 and rendered movable with respect to the lateral wall 3. Said aperture plate 4 is provided with an aperture 4a, and the elastic member 1 protrudes therefrom or descend therein according to the movement of the aperture plate 4. FIG. 2 shows a state free of pressure. When a pressure is applied to the elastic member 1 through the aperture plate 4, a part of the elastic member 1 protrudes from the aperture 4a in the form a convex lens, according to the applied pressure. On the other hand, when a negative pressure is applied to the elastic member 1 through the aperture plate 4, the elastic member 1 assumes the form of a concave lens at the aperture 4a.

In the elastic member 1 of the present invention, the first elastic member 1-1 at the protruding side has a modulus of elasticity E1 which is larger than that E2 of the second elastic member 1-2 adjacent to said first elastic member. The "protruding side" means a side of the elastic member 1 that protrudes or descends along the optical axis h according to the pressurization or depressurization of the elastic member 1 by the deforming member.

Since E1>E2 in the present invention, a downward movement of the aperture plate 4 in FIG. 2 induces a larger deformation in the elastic member 1-2. As explained before, said deformation tends to assume, at the interface of the elastic members 1-1 and 1-2, an aspherical form with a stronger curvature at the peripheral area. Consequently the elastic member 1-1 receives a bending force, induced by the central upward movement of the elastic member 1-2, together with a force for increasing the interfacial area between the elastic members 1-1 and 1-2. If the elastic member 1-1 is thin, the rigidity thereof is principally governed by the stretching rigidity. Consequently, in this case, the elastic member 1-1 tends to minimize the surface area and undergoes an almost parabolic deformation. On the other hand, if the elastic member 1-1 is relatively thick, it tends to avoid a rapid change in curvature by the bending rigidity thereof.

Thus, in either case, the elastic member 1-1 tends to assume an aspherical form with a weaker curvature in the peripheral area, rather contrary to the elastic member 1-2. Thus the surface 1a of the elastic member 1-1 in the aperture 4a undergoes deformation while maintaining an almost spherical form, if the effect for deforming the elastic member 1-1 into an aspherical form with stronger curvature in the peripheral area is balanced with the effect for deforming the elastic member 1-1 into an aspherical form with weaker curvature in the peripheral area.

Thus an aspherical form with weaker curvature in the peripheral area can be obtained by increasing the modulus of elasticity of the elastic member 1-1 or increasing the thickness thereof, and an aspherical form with stronger curvature in the peripheral area can be obtained by decreasing the modulus of elasticity of the elastic member 1-1 or reducing the thickness thereof. Consequently, there can be obtained a variable-focus optical element capable of deformation while constantly maintaining a spherical form or a desired aspherical form by suitably selecting the initial form and the modulus of elasticity of the elastic members 1-1 and 1-2. Such selection of the initial form and the modulus can be easily achieved by a program of structural analysis utilizing a finite parameter method.

The deformation of the surface 1a of the first elastic member 1-1 at the protruding side in the aperture 4a is determined by the initial form and Poisson's ratio of the first and second elastic members 1-1, 1-2 and the ratio E1/E2 of the moduli of elasticity of the first and second elastic members 1-1, 1-2.

In case both first and second elastic members 1-1, 1-2 have Poisson's ratios of an ordinary rubber elastomer in a range of ca. 0.45–0.49, a condition:

$$5 < E_1 t_1 / E_2 t_2 < 100 \tag{1}$$

is preferably satisfied in order to maintain spherical deformation of the surface 1a in the aperture 4a, wherein $t_1$ and $t_2$ are axial thicknesses of the first and second elastic members 1-1 and 1-2, respectively. However, if the first elastic member 1-1 is not uniform in thickness but is thicker in the peripheral area, the desirable range of $E_1 t_1 / E_2 t_2$ is slightly narrower than that indicated by the relation (1), and, if the member 1-1 is thinner in the peripheral area and thicker in the central area, said desirable range is slightly wider than that indicated by the relation (1).

The values of $t_1$ and $t_2$ are preferably so selected as to satisfy a relation $t_1 \leq t_2$, since there will otherwise be required a larger force for deforming the elastic member 1-1. Also in case of using the variable-focus optical element of the present invention in an ordinary lens, there is generally required a condition $2 \text{ mm} \leq t_1 + t_2 \leq 30 \text{ mm}$. Though there is no specific lower limit for $t_1$, an excessively thin first elastic member 1-1 may show an insufficient strength or wrinkles at the molding.

The absolute values of the moduli E1, E2 of the elastic member 1-1, 1-2 are determined in consideration of the forces required for deformation and the influence of acceleration caused by gravity and vibration. More specifically, larger values of E1, E2 allow to reduce the influence of gravity etc. but increase the force required for deformation. On the other hand, smaller values of E1, E2 reduce the force required for deformation, but result in a larger deformation caused for example by gravity, and it becomes difficult to obtain the initial form with sufficient precision in molding because the materials are softer.

In consideration of these conditions, the modulus $E_2$ is preferably in a range of $10^2$–$10^7 N/m^2$, more preferably $10^3$–$10^6 N/m^2$. The modulus $E_1$ is determined from the modulus $E_2$ and the deformation desired for the surface 1a. If a spherical deformation is desired, the modulus $E_1$ is determined from the relation (1).

Figure 3A:
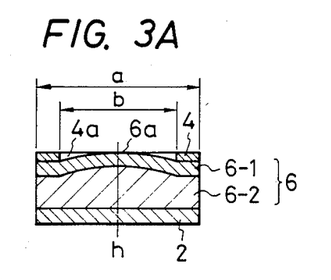
FIGS. 3A and 3B are cross-sectional views of another embodiment of the variable-focus optical element of the present invention.

In the following there will be given a numerical example. The elastic members are molded as shown in FIG. 3A, wherein the elastic members 6-1, 6-2 respectively have thicknesses of 1 mm and 4 mm along the optical axis h. The surface 6a of the elastic member 6-1 in the aperture 4a and the interface of the elastic members 6-1, 6-2 are both formed as a spherical surface with a radius of curvature of 50 mm in the absence of pressure. The diameter a of the element is 25 mm, while the diameter b of the aperture is 20 mm, and the elastic members 6-1, 6-2 both have a Poisson's ratio of 0.47.

Figure 3B:
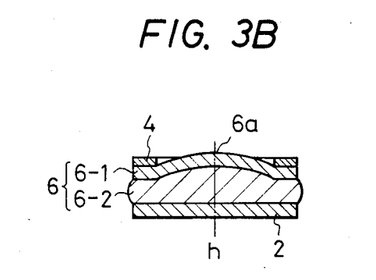

The deformation of the surface 6a in the aperture 4a when the distance between the aperture plate 4 and the bottom plate 2 is reduced by $\Delta Z$ as shown in FIG. 3B, was determined by a structural analysis program. It was found that the aberration form the spherical surface was always less than 10 $\mu$m within a range of $\Delta Z$=0–0.4 mm, when the moduli of the elastic members 6-1, 6-2 are so selected that $E_1/E_2=60$, $E_1=6\times 10^5 N/m^2$ and $E_2=10^4 N/m^2$. The radius of curvature of the surface 6a is about 30.2 mm when $\Delta Z$=0.4 mm, and the surface 6a deforms in a range of radius of curvature of 50–30.2 mm while maintaining a substantially spherical form when $\Delta Z$ is varied in a range of 0–0.4 mm. Thus, if the surface 6a is utilized as a reflecting surface for example with an evaporated layer, a change of 26 diopters in refractive power can be obtained only with a change of 0.4 mm in the distance between the aperture plate 4 and the bottom plate 2. Also if the surface 6a is utilized as a refractive surface, a change of 6.6 diopters in the refractive power can be obtained for a refractive power of 1.5 for the elastic members 6-1, 6-2.

In the foregoing numerical example it is assumed that the elastic members 6-1, 6-2 are not confined, as shown in FIG. 3B, by the lateral wall 3 shown in FIG. 2. However, in the presence of said lateral wall 3, a similar spherical deformation can be obtained by selecting a larger modulus ratio $E_1/E_2$ in the order of 100.

In the following there will be explained other embodiments of the present invention.

Figure 4:
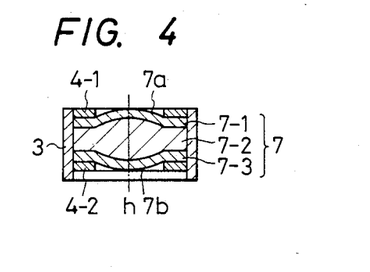
FIG. 4 is a cross-sectional view of another embodiment of the variable-focus optical element of the present invention, having a pair of aperture plates.

FIG. 4 shows an embodiment in which two surfaces 7a, 7b are both deformable. Among transparent elastic members 7-1, 7-2, 7-3, the modulus of elasticity is smallest in the elastic member 7-2 neighboring the elastic members 7-1, 7-3 at the protruding sides. The moduli of said elastic members 7-1 and 7-3 may be mutually same or different. Aperture plates 4-1, 4-2 constitute deforming members. In the illustrated example, the aperture plate 4-1 is fixed to the laterial wall 3 while the aperture plate 4-2 is rendered movable in the direction of optical axis h along the lateral wall 3 to cause simultaneous deformations of two surfaces 7a, 7b. Naturally the aperture plates 4-1, 4-2 may be rendered movable.

Figure 5:
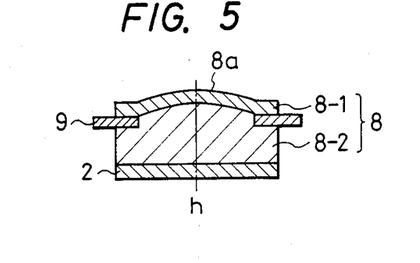
FIG. 5 is a cross-sectional view of another embodiment of the variable-focus optical element of the present invention, wherein an aperture plate is provided in an elastic member.

FIG. 5 shows another embodiment in which the aperture plate is provided in the elastic member 8. Of elastic members 8-1, 8-2, the former at the protruding side has a larger elastic modulus. A surface 8a of the elastic member 8-1 constitutes a lens surface. An aperture plate 9 is adhered to the elastic members 8-1, 8-2, and a deformation of lens surface similar to that in the embodiment shown in FIG. 3 can be realized by varying the distance between the bottom plate 2 composed for example of glass and the aperture plate 9.

Figure 6:
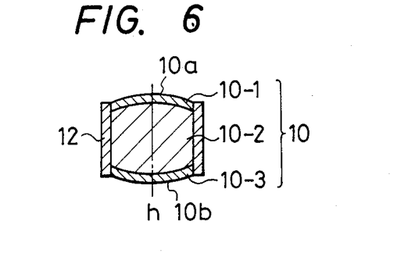
FIG. 6 is a cross-sectional view of another embodiment of the variable-focus optical element of the present invention, utilizing a cylindrical piezoelectric element as the deforming member.

FIG. 6 shows another embodiment in which an external force is applied from the external periphery of an elastic member 10. A lateral wall 12, composed of a cylindrical piezoelectric element varies the internal diameter thereof according to an applied voltage, thereby deforming surfaces 10a, 10b of the elastic member 10. In this embodiment the deforming member is constituted by the lateral wall 12. Elastic members 10-1, 10-3 at the protruding sides have larger elastic moduli than that of the neighboring elastic member 10-2.

The elastic members to be employed in the present invention can be composed of natural or synthetic rubber, preferably of a low elastic modulus, in order to obtain a large elastic deformation. Also a high transparency is desirable in case the optical element of the present invention is utilized as a lens. Such elastic members can be advantageously composed of silicone rubber or ethylene or propylene rubber. Plural elastic members with different elastic moduli can be conveniently obtained by varying the degree of crosslinking.

Examples of the material for elastic members in the present invention are diene compounds, rubbers obtained by copolymerization of diene compounds and other vinylic compounds, and materials obtained by sulfur vulcanization or crosslinking for example with a peroxide of the foregoing rubbers.

Other examples of such elastomers are polymers obtained by copolymerizing ethylene with one or more compounds selected from $\alpha$-olefins, diene compounds, mono-polar radical-substituted vinylic compounds such as acrylates, methacrylates, styrene, vinyl chlorides, vinyl ethers etc., and di-substituted vinylic compounds such as maleates to significantly reduce or entirely eliminate the crystallinity of ethylene.

Still other examples of such elastomers are polyisobutene, atactic polypropylene, polyvinyl chloride with an elevated amount of plasticizer, copolymers of two or more acrylic and methacrylic esters, copolymers of two or more acrylic derivatives containign water or high-boiling solvents, silicone polymers such as dimethyl silicon or diphenyl silicon, and phosphazene polymers.

As an example of elastomer other than polymers, there can be conveniently employed an elastic liquid obtained by dissolving a hydrocarbon in aluminum soap such as aluminum laurate. The elastic modulus of the elastomer can be regulated by the molecular weight and degree of crosslinking.

Figure 7A:
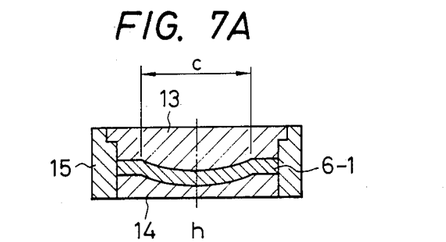
FIG. 7A shows a step of molding an elastic member at the protruding side.
Figure 7B:
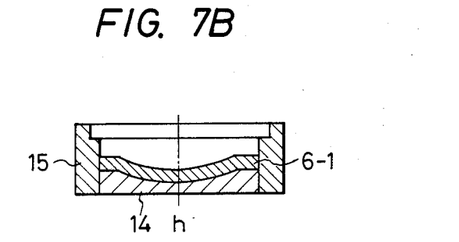
FIG. 7B shows a state after removal of an upper mold in FIG. 7A.
Figure 7C:
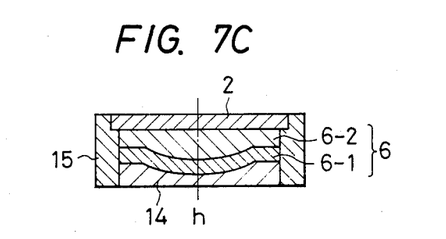
FIG. 7C shows a step for molding a superposed elastic member.
Figure 7D:
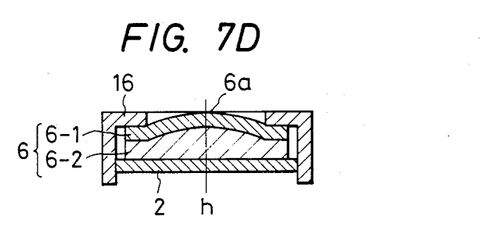
FIG. 7D shows a variable-focus optical member prepared by the steps shown in FIGS. 7A to 7C.

Now reference is made to FIGS. 7A to 7D and 8 for explaining a preferred process for obtaining the optical element of the present invention. The optical element of the present invention has to be prepared with a high precision with respect to the surface form of the elastic member, in order to achieve desired performance as the optical element. It is therefore desirable to prepare the elastic member 1-1, as shown in FIG. 2, with a high precision for example with a metal mold, and then to prepare the elastic member 1-2. In the following there will be explained an example of a process for preparing the element shown in FIG. 3. At first the elastic member 6-1, shown in FIG. 3, is formed, as shown in FIG. 7A, by an upper mold 13, a lower mold 14 and a lateral mold 15. Said formation can be achieved for example by casting or injection molding. The surfaces of the upper and lower molds 13, 14 are preferably subjected to suitable separation treatment, and that of the upper mold 13 is given a better separation property than that of the lower mold 14, for example by teflon coating. After the elastic member 6-1 is solidified, the upper mold 13 is removed as shown in FIG. 7B, then the bottom plate 2 for example of glass is placed as shown in FIG. 7C and the elastic member 6-2 is formed between said bottom plate 2 and the already formed elastic member 6-1. The material for the elastic member 6-2 is injected through an inlet provided in the lateral mold 15 or in a part of the bottom plate 2 outside of the light path. After the elastic member 6-2 is solidified, the lower mold 14 and the lateral mold 15 are removed, and the obtained elastic members are placed in a separately prepared lateral wall 16 as shown in FIG. 7D. In the variable-focus optical element shown in FIG. 7D, the focal length can be varied by the displacement of the bottom plate 2. In this case, the lateral wall 16 constitutes the deforming member.

The formation of the elastic member 6-1 shown in FIGS. 7A and 7B can also be achieved by so-called spin casting, in which case a liquid material for the elastic member 6-1 is solidified on a rotating mold before the step of FIG. 7C.

The elastic member at the protruding side need not necessarily be of a uniform thickness but can have a suitable distribution in thickness for controlling the surface from when deformed.

Figure 8:
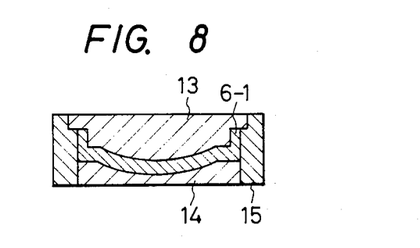
FIG. 8 is a cross-sectional view of a step for molding a protruding elastic member with another upper mold.

The elastic member neighboring said elastic member at the protruding side is preferably composed of a very soft material, and, because of adhesion, may not be separable from the lateral mold 15 shown in FIG. 7. In such case it is effective to modify the form of the upper mold 13 as shown in FIG. 8 so that the lateral mold 15 is in contact with the harder elastic member 6-1.

The refractive indexes of the plural elastic members employed in the variable-focus optical element of the present invention may be mutually the same or different. In case of different refractive indexes, the light passing through said optical element is refracted also at the internal interface of the element. On the other hand, if the refractive indexes are same, the refractive power of the optical element is determined by the curvature of the protruding or retracted surface, and the refractive index of the elastic members. Consequently, the use of substantially the same refractive indexes is desirable in consideration of the precision of variation of focal length etc.

The variable-focus optical element of the present invention is not limited to the foregoing embodiments but is subject to other various modifications. For example three or more elastic members may be employed in lamination, instead of two elastic members employed in the foregoing embodiments.

In the following there will be explained a detailed example of the process for obtaining the variable-focus optical element of the present invention, while making reference again to FIGS. 7A to 7D. The basic structure of the optical element is the same as shown in FIG. 3A.

Silicone rubber (manufactured by Shinetsu Chemical Industries under a trade name KE106) was added with 10 wt. % of a catalyst (manufactured by Shinetsu Chemical Industries under a trade name Catalyst RG), then agitated and deformed in a vacuum. The obtained mixture was placed in a space defined by the upper mold 13, lower mold 14 and lateral mold 15 shown in FIG. 7A, and was let to stand for 4 hours at 65° C. to obtain a solidified transparent elastic member 6-1. The lateral mold 15 had an internal diameter of 25 mm, while the upper and lower molds 13, 14 had a diameter c of 20 mm in curved areas, which were composed of spherical surfaces of a radius of curvature of 50 mm. The elastic member 6-1 had a thickness of 1 mm along the optical axis h. The upper mold 13 was coated with a fluorinated resin for improving the separation property.

Then the upper mold 13 was removed as shown in FIG. 7B. A mixture obtained by mixing silicone rubber (manufactured by Shinetsu Chemical Industries under a trade name KE106), a catalyst (manufactured by Shinetsu Chemical Industries under a trade name Catalyst RG), silicone rubber (manufactured by Shinetsu Chemical Industries under a trade name KE104 Gel) and a catalyst (manufactured by Shinetsu Chemical Industries under a trade name Catalyst 104) in a weight ratio of 10:1:100:10 followed by vacuum deforming was placed in a space defined by the glass plate 2, elastic member 6-1 and lateral mold 15 as shown in FIG. 7C and was let to stand for 72 hours at 40° C. to obtain a solidified transparent elastic member 6-2, having a thickness of 4 mm along the optical axis h.

Then the lower and lateral molds 14, 15 were removed and the obtained elastic members were placed in a lateral wall 16 as shown in FIG. 7D. In response to a movement of the glass plate 2 by 0.4 mm to pressurize the elastic members, the surface 6a of the elastic member 6 shows a deformation in substantially spherical form, with a change in the radius of curvature in a range form 50 to 35 mm.

As explained in the foregoing, the present invention provides a variable-focus optical element capable of deformation while maintaining a spherical form or a desired aspherical form by a suitable selection of the initial forms and elastic moduli of the laminated elastic members. The variable-focus optical element of the present invention can be prepared with a higher precision in comparison with a so-called liquid lens, and does not show a surfacial deformation by gravity or vibration, since the elastic member at the protruding side can withstand these influences. Also the performance of said optical element is less influenced by the polarization of the incoming light beam, in comparison with other lenses utilizing usual electro-optical effects.

In the following there will be explained an application of the variable-focus optical element explained before. As explained in the foregoing, said variable-focus optical element is capable of arbitrarily varying a spherical or aspherical surface form within a certain range, so that the refractive power $\phi$ of the element can be varied by the change in the surface form, or in the radius of curvature in case of a spherical surface. It is therefore possible to rapidly and accurately vary the refractive power $\phi$ of the element by an electric signal, which controls the pressure to the elastic members for example with laminated piezoelectric elements.

On the other hand, there is already known a focus detecting method wihch enables automatic focusing by detecting the sharpness of an image on an image sensor from image signals obtained from said image sensor and driving a photographing lens so as to maximize said sharpness. In such method it is necessary to vary the state of focusing of the image on the image sensor by suitable means and to detect the resulting change in sharpness, since the driving direction of the photographing lens cannot be identified from a single image.

For this reason there has been employed a method of varying the optical path length from the object to the image sensor by axially vibrating the image sensor by a small amount or by periodically inclining a flat glass plate positioned in the optical path, or a method of varying the focus state of the image on the image sensor by axially vibrating a part of the lens elements in the photographing lens by a small amount. However, the vibration of the image sensor involves a difficult mounting of the image sensor to the camera, and the use of a flat glass plate which does not contribute to imaging, gives rise to an additional cost. Also in either method the focusing itself has to be conducted by a conventional movement of a focusing lens in the photographing optical system, since the movement of the image sensor or the inclination of the flat glass plate has to be increased and requires a large driving mechanism for achieving the focusing operation in addition to the focus detection. For this reason there have been required two separate driving mechanisms for focus detection and focusing.

Also in the method of axially vibrating a lens group in the photographing optical system, the difficulty in achieving a high-speed vibration of heavy lenses necessitates the use of a large driving mechanism or leads to a slow response in focus detection.

However such drawbacks in the conventional technologies can be overcome by the variable-focus optical element of the present invention. In the following there will be explained an example of the focus detection device utilizing the variable-focus optical element of the present invention.

Figure 9:
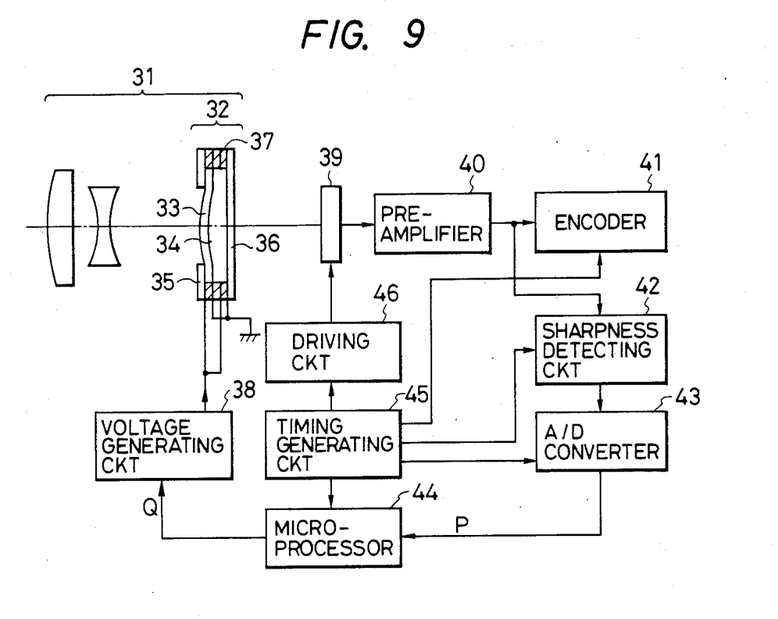
FIG. 9 is a block diagram of an embodiment of the focus detecting device utilizing the variable-focus optical element of the present invention.

FIGS. 9 to 13 show an embodiment of the focus detection device of the present invention. In FIG. 9, there are shown a photographing optical system 31; a variable-focus optical element 32 shown in Fig. 3; transparent elastic members 33, 34; an aperture plate 35 with a circular aperture; a glass plate 36; a container 37 composed of laminated annular piezoelectric elements and housing said elastic members 33, 34; and a voltage generating circuit 38. In said optical element 32, the container 37 composed of annular piezoelectric elements is contracted in the lateral direction in the illustration, in response to the voltage supplied from the voltage generating circuit 38, whereby the elastic members 33, 34 are pressurized to deform the surface of the elastic member 33 in the aperture plate 35, thus inducing a change in the refractive power $\phi$. The change in said refractive power is controlled by a control signal $\theta$ supplied to the voltage generating circuit 38. An image sensor 39, composed for example of a CCD, is placed at a determined image plane of the photographing optical system 31. Thus the focus state of the image of object on the image sensor 39 can be varied by controlling the refractive power $\phi$ through the control signal $\theta$. The focus state of the image on the image sensor 39 can be varied since the focal plane of the photographing optical system 31 moves toward the object when the refractive power $\phi$ of the optical element 32 increases, and vice versa. There are further shown a preamplifier 40; an encoder 41 for mixing synchronization signals with image signals to obtain video signals; a sharpness detection circuit 42 for detecting the sharpness P of the image on the image sensor from the image signals; an A/D converter 43; a microprocessor 44; a timing generating circuit 45 for generating timing signals for the entire system; and a driving circuit 46 for the image sensor 39.

Figure 10:
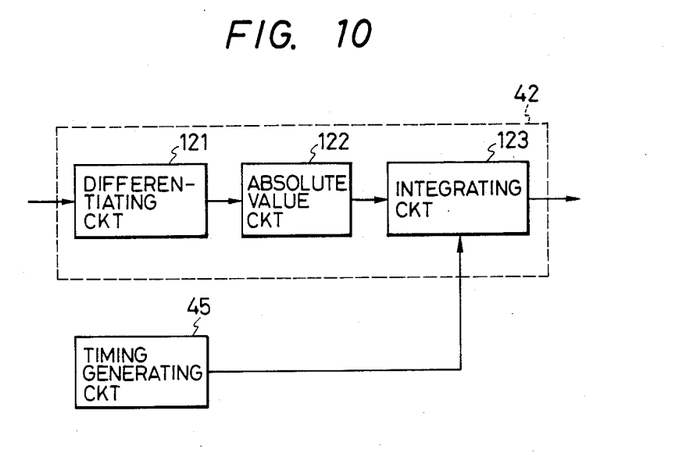
FIG. 10 is a block diagram showing an example of a sharpness detecting circuit.

FIG. 10 shows an example of the sharpness detecting circuit 42 shown in FIG. 9. There are provided a differentiating circuit 121, an absolute value circuit 122 and an integrating circuit 123. For identifying the contrast of the image projected on the image sensor 39, high-frequency components of the image in a determined area of the image sensor 39 are extracted from each frame according to a timing signal from the timing generating circit 45 and a signal P, for evaluating the image sharpness, is sent to the microprocessor 44 through the A/D converter 43.

Figure 11A:
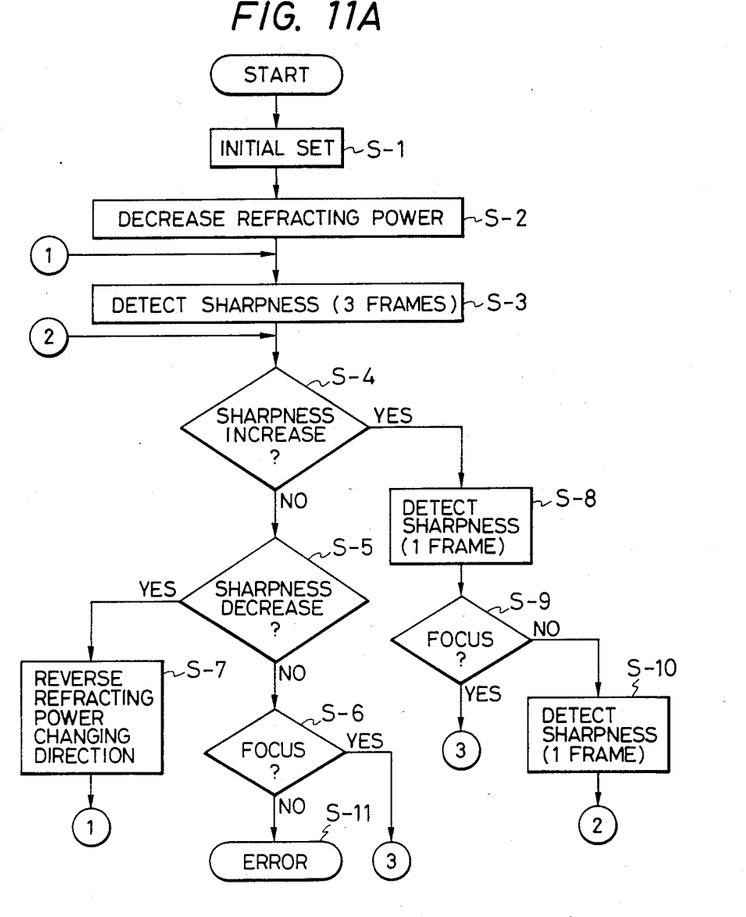
FIGS. 11A and 11B are flow charts showing the function of a microprocessor.
Figure 11B:
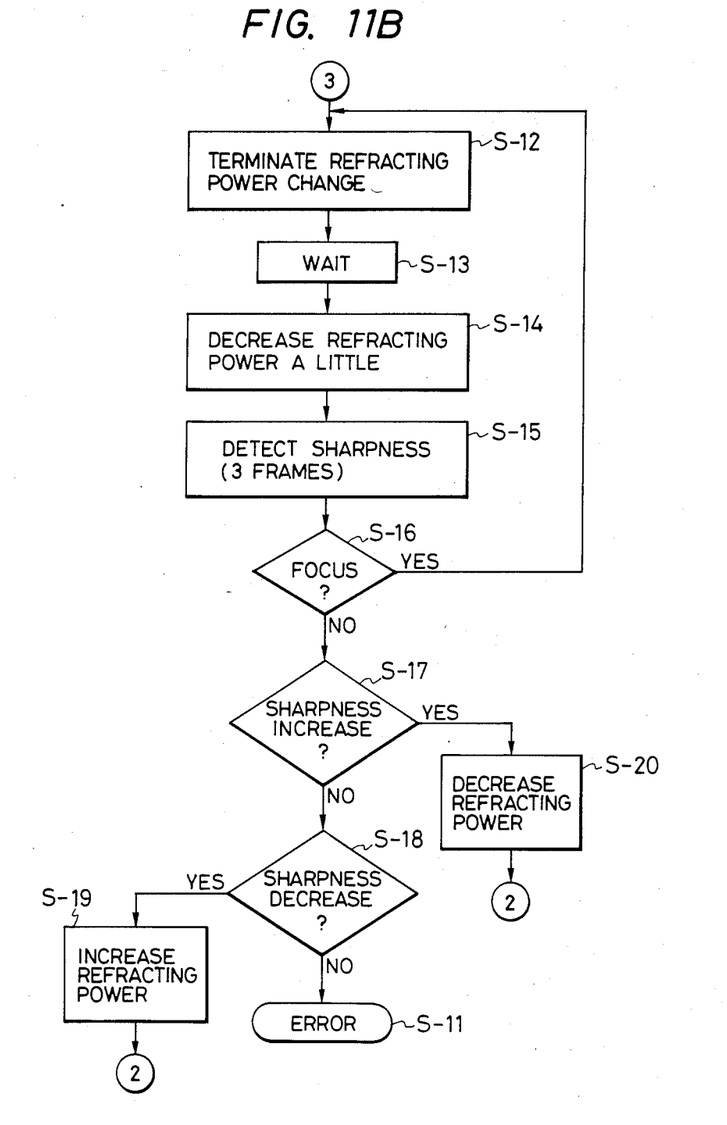
Figure 12A:
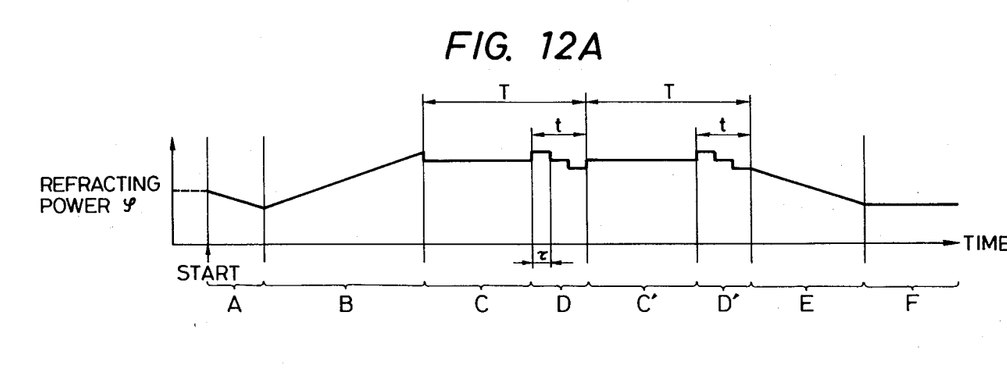
FIGS. 12A and 12B are charts showing time-dependent change of the refractive power and sharpness of the variable-focus optical element.
Figure 12B:
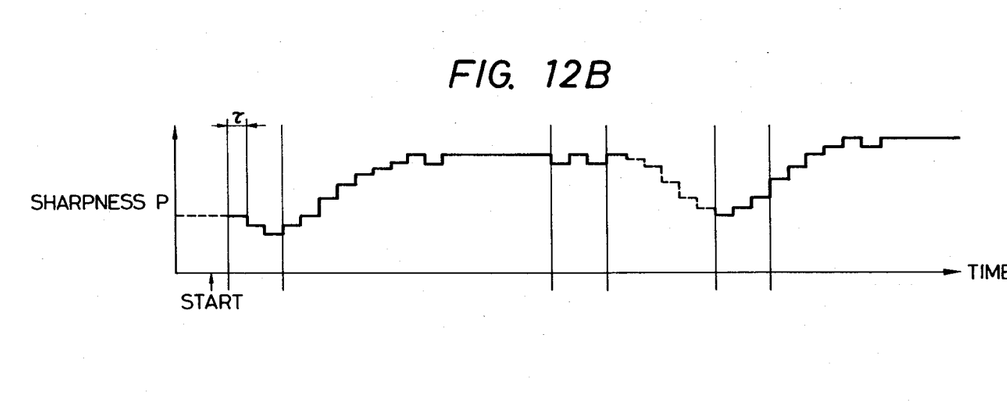

Now reference is made to FIGS. 11 and 12 for explaining the function of the microprocessor 44 and the focus detecting method in the present device. FIG. 11 is a basic flow chart showing the function of the microprocessor 44, while FIG. 12A is a chart showing the time-dependent change of the refractive power $\phi$ of the variable-focus optical element 32, and FIG. 12B shows the time-dependent change of the image sharpness P detected by the detecting circuit 42. $\tau$ in FIG. 12 indicates a time corresponding to a frame. As shown in FIG. 11, the microprocessor 44, after an initial setting of registers etc. in a step S-1, releases the control signal $\theta$ to the voltage generating circuit 38 so as to reduce the refractive power $\phi$ of the variable-focus optical element 32 with a constant rate from a predetermined value. The control signal $\theta$ to the voltage generating circuit 38 is maintained constant until modified next time. Thus, as shown in FIG. 12A, the refractive power $\phi$ decreases at a constant rate for a period A. Then, in a step S-3, the microprocessor 44 fetches the sharpness P detected by the detecting circuit 42 in the succeeding three frames, and in succeeding steps S-4, S-5 and S-6, identifies the direction of variation of the sharpness P in said succeeding three frames. More specifically, there is identified whether the values P1, P2, P3 of the sharpness P in the immediately preceding frames are increasing (P1 <P2<P3), or decreasing (P1>P2>P3), or have shown a maximum (P1<P2>P3) or otherwise.

If the sharpness decreases as shown in the period A in FIG. 12A a step S-7 inverts the direction of change of the refractive power $\phi$ as shown in a period B, and the program returns to the step S-3 to repeat the detection of sharpness P and the identification of varying direction of the refractive power $\phi$. On the other hand, if the steps S-4, S-5 and S-6 identify an increasing change of the sharpness P as in the period B, indicating that the refractive power $\phi$ has changed toward the in-focus state, the program branches from the step S-4 to a step S-8, while retaining the varying direction of the refractive power $\phi$, to fetch the sharpness P4 in a succeeding frame, and a step S-9 compares said sharpness with the sharpness P3 in the immediately preceding frame. If P4>P3, indicating that the refractive power $\phi$ has been changed to increase the sharpness, a next step S-10 fetches the sharpness P5 in a succeeding frame and the program returns to the step S-4. As the steps S-4, S-5 and S-6 compares the sharpness in the immediately preceding three frames, there is now identified the direction of change of the refractive power $\phi$ through the values P3, P4 and P5. On the other hand, if P4 21 P3 in the step S-9, indicating a relation P2<P3>P4 corresponding to the detection of a maximum value, the program proceeds to a step S-12 shown in FIG. 11B. Also in case a maximum is identified in the steps S-4, S-5 and S-6, the program proceeds to said step S-12 from the step S-6. On the other hand, in case the steps S-4, S-5 and S-6 cannot detect an increase in the sharpness P, nor a decrease nor a maximum thereof, the direction toward the in-focus state cannot be identified since the object has an excessively low contrast or there is a competition between far and close objects. In such case there is executed an error recovery step S-11 for repeating the procedure from the start or providing a corresponding message in the view finder.

Also if the optical system is significantly out of focus, the sharpness P may not provide a detectable change for a small change of the refractive power $\phi$. In such case the refractive power of the variable-focus optical element 32 is continuously changed until the sharpness P shows a change or until said refractive power reaches a limit of a predetermined regulatable range, and the direction of change of the refractive power $\phi$ is identified in the former case from said change in the sharpness, or the direction of change of the refractive power $\phi$ is inverted in the latter case.

In case the maximum value of the sharpness P is identified in the step S-6 or S-9, the step S-12 returns the refractive power $\phi$ of the optical element 32 to the refractive power $\phi_0$ in the in-focus state when the sharpness becomes maximum, and a step S-13 retains this state for a period T-t as shown in a period C in FIG. 12. Consequently the focused state is retained unless the camera or the object moves. After the lapse of said period T-t, the program proceeds to a step S-14 for varying the refractive power $\phi$ by a small amount around the value $\phi_0$ during a period t. In the present embodiment the refractive power is decreased from $\phi_0+\Delta\phi$ to $\phi_0-\Delta\phi$ as shown in periods D, D', wherein $\Delta\phi$ corresponds to a movement of the focal plane of the photographing optical system approximately by the depth of focus. A succeeding step S-15 fetches the sharpness P in three frames during said small change of the refractive power $\phi$, and steps S-16, S-17 and S-18 compare thus fetched values in the same manner as in the steps S-4, S-5 and S-6 shown in FIG. 11A. If the sharpness P at the middle frame is largest as shown in the period D in FIG. 12, the program returns to the steps S-12 to retain the former refractive power $\phi$ as in the period C'. On the other hand, if the sharpness P is increasing as in the period D', a step S-20 is executed to release a control signal to decrease the refractive power $\phi$, and the program returns to the step S-3 in FIG. 11A. Also if the sharpness P is decreasing, a step S-19 releases a control signal to increase the refractive power $\phi$, and the program returns to the step S-3. Otherwise an error recovery is executed by the step S-11.

In the foregoing explanation the direction of change of the refractive power $\phi$ is identified from the comparison of the sharpnesses P in three frames, but it is also possible to effect said identification by the sharpness values for example in two frames. In this case there are employed two sharpness values P1, P2 detected in succession, and a detectable difference $\Delta P$ of the sharpness. An in-focus state is identified by a condition $|P1-P2|<\Delta P$. On the other hand, the direction of change of the refractive power $\phi$ is retained or inverted respectively if P2>P1 or P2<P1.

The above-explained focus detecting method could not be exploited in the conventional technology because of the aforementioned reasons, but is rendered possible by the variable-focus optical element 32 of the present invention which is capable of controlling the refractive power with satisfactory precision and within a wide range. A very small change in the refractive power $\phi$ can be easily achieved for example by the use of piezoelectric elements. In this manner there can be obtained a compact focus detecting device with excellent response, since said variable-focus optical element is small and does not require a mechanical driving unit.

As already known, the distance between the object and the image for a determined lens becomes minimum when the image magnification is equal to $\pm 1$, and, in the vicinity of this state, a slight movement of the lens scarcely moves the image position. Consequently, in order to vary the focus state of the image on the image sensor by a limited movement of the lens, the image magnification of the lens should not be close of $\pm 1$. However, to maintain the image magnification of a lens group away from $\pm 1$ over all the distance to the object, or in all focal length in case of a zoom lens, is a significant limitation in the lens designing, which eventually leads to a large dimension or an elevated cost in the photographing lens. It is also possible to maintain a fixed focus state by stopping the function of the focusing lens after an in-focus state is reached, to inspect a change in the image sharpness caused by the movement of the object or the camera, and, in case of such change, to move the focusing lens in an arbitrary direction and to identify the correct moving direction thereof anew from the resulting change in sharpness. Also in such method, however, an unstable image is obtained by a change in the focus state of the photographing optical system in case another object moves in front of the object or in case of panning, since the driving and stopping of the focusing lens require a longer time. Also in this method, the image magnification of the focusing lens should not be close to $\pm 1$ in any state.

However, these drawbacks can be overcome by the focus detecting device as shown in FIG. 9. In the present focus detecting device, the focus state is slightly modified for a period t, as the periods D, D' shown in FIG. 12, at an interval of T in the in-focus state, in order to confirm the focus state or to find a new focusing direction. In this manner it is rendered possible, for example for an object of low contrast, to avoid erroneous focusing of the photographing lens, and to rapidly identify the focusing direction. Besides, the focus state is fixed in the period T−t, such as the periods C, C' in FIG. 12, in order to reduce the proportion of deteriorated image caused by a change in the focus state in the periods D, D', thereby reducing the deterioration in image quality. The deterioration in image quality becomes less if T is selected larger in comparison with t, but an excessively large value of T deteriorates the response of automatic focusing. Consequently, in an ordinary television camera, T and t are preferably selected in respective ranges of 0.2 sec. $\leq T \leq 2$ sec. and $T/10 \leq t \leq T/3$. Also the times T and t may be variable. For example, a large value of T is selected in case the aperture of the photographing lens is small since the time-dependent change of the sharpness P is slow. The value of T may be smaller for a large lens aperture. Also the small change $\Delta\phi$ of the refractive power $\phi$ of the variable-focus optical element 32 may also be rendered variable, assuming a larger value for a smaller aperture. Furthermore, instead of directly detecting the lens aperture, it is also possible to adopt a predetermined small change in the refractive power after the in-focus state is reached, then estimate the lens aperture from the resulting change in the sharpness and modify the amount of said small change in the refractive power according to the thus estimated lens aperture.

The distance between the object and the image shows a minimum for the lens displacement, but exhibits a monotonous change for the change in the refractive power $\phi$ of the variable-focus optical element 32, unless the object plane is positioned at said optical element 32. To place the object plane outside the optical element 32 is quite easy in the lens designing. Said object plane can be placed at any position in the photographing optical system, so that the designing thereof can be significantly facilitated and the conventional drawbacks can be easily overcome.

Also in case of a zoom lens, if the change in the refractive power $\phi$ of the variable-focus optical element 32 is utilized not only for focusing to the object but also for compensation of a change in the position of inawer image plane in case the image magnification is varied, it is also possible, for improving the response, to detect an operation of varying the image magnification, and, if such operation is conducted in a period of constant refractive power such as the periods C, C' shown in FIG. 12, to effect a small change of the refractive power $\phi$, thereby identifying a new direction of change of the refractive power.

In the example shown in FIG. 12, the period t of a small change of the refractive power $\phi$ is selected at $t=3\tau$. However other values of t may be acceptable as long as a condition $t \geq 3\tau$ is satisfied. For example a condition $t=6\tau$ to detect the sharpness of every other frames. In the foregoing explanation $\tau$ is equal to the period of one frame, but it can also be equal to the period of one field in case of an interlaced scanning, or to the period of plural frames. Also the sharpness P may be detected from the image of an entire frame or of a limited area such as a half frame.

As explained in the foregoing, the present focus detecting device is capable of rapidly displacing the focal plane position of a photographing optical system by an arbitrary amount through the use of a variable-focus optical element in said optical system, and is therefore capable of causing a small change in the focus state from an in-focus state and rapidly determining the focusing direction from the resulting change in sharpness even if said in-focus state is eventually lost, thereby enabling automatic focusing with satisfactory response.

Figure 13:
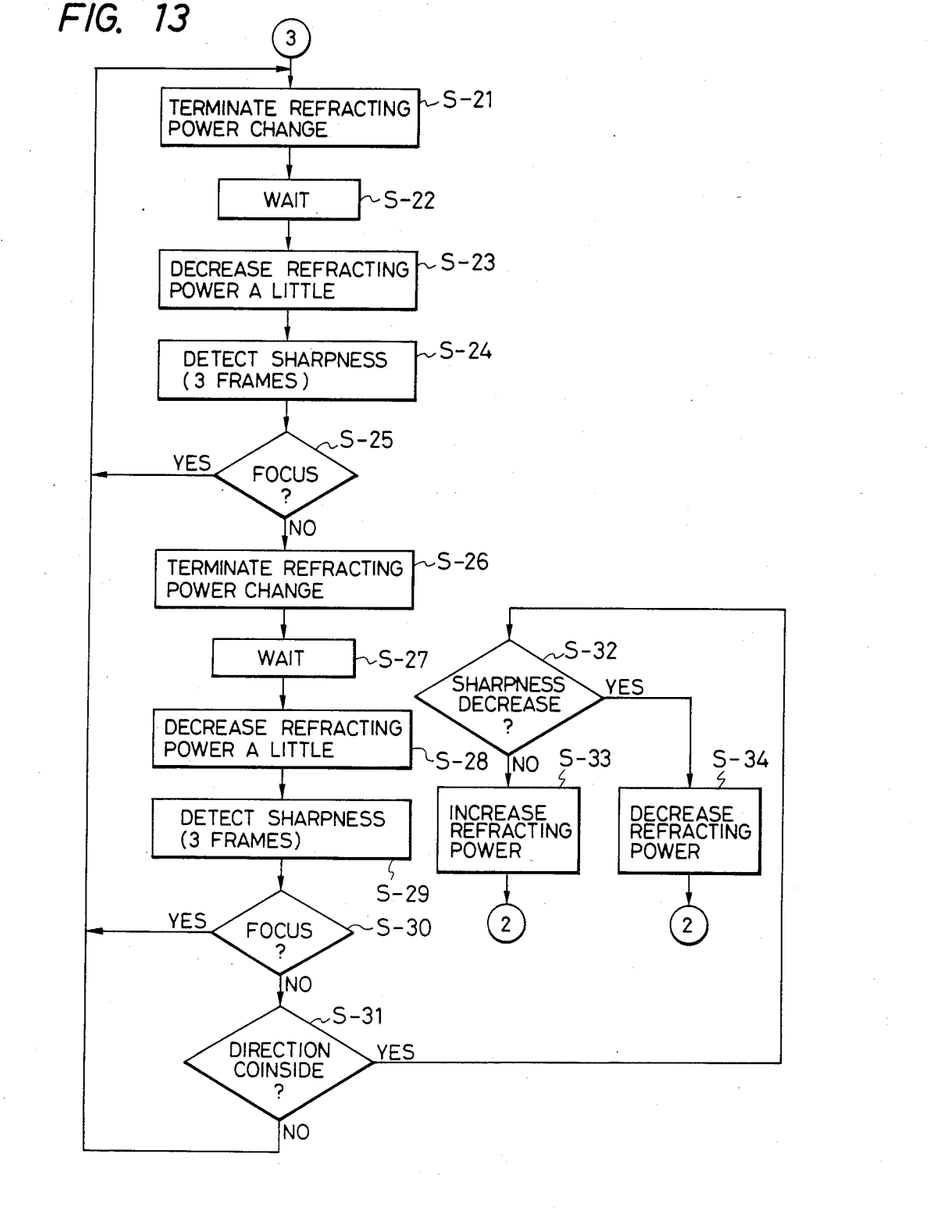
FIG. 13 is a flow chart showing another structure of the flow chart shown in FIG. 11B.

A further stable automatic focusing operation can be achieved by replacing a branch portion (3) in FIG. 11 by a sequence shown in FIG. 13. In the flow shown in FIG. 13, there are conducted two small changes in the refractive power $\phi$ with an interval therebetween after an in-focus state is reached, and a step P-31 identifies whether the direction of change in the sharpness P is the same in said two changes. The refractive power $\phi$ is varied to reach a new focused state in case said directions are mutually the same, but the previous focus state is maintained if said directions are mutually different. Thus the focus state changes to increase the sharpness P, in response to a slow change of the sharpness P, but is not changed for rapid irregular changes. Consequently a stable image can be obtained since the automatic focusing does not respond to a vibration of the camera or a panning.

In the above-explained focus detecting device there may be employed other variable-focus optical elements for example utilizing liquid crystal, crystal or liquid and controlling the refractive power $\phi$ or refractive index $n=1/\phi$ in response to a pressure, heat, an electric or magnetic field. However such optical element has to be transparent to light.

The variable-focus optical element of the present invention is capable of providing a desired refractive power in a precise manner with a simple structure and through a simple control method, and is suitable for use in the above-explained focus detecting device. Naturally the application of said optical element is not limited to such focus detecting device. Also the above-described focus detecting device shows a satisfactory response with a simple inexpensive structure and enables the obtaining of a stable image.

What is claimed is:

1. A variable-focus optical element comprising:
   plural elastic members laminated in the direction of an optical axis; and
   deforming means for deforming said elastic members thereby causing a surface thereof to protrude or retract from a determined aperture; the elastic modulus of a first elastic member positioned at the protruding or retracting side of said plural elastic members being larger than that of a second elastic member neighboring said first elastic member.

2. A variable-focus optical element according to claim 1, wherein the thickness $t_1$ of said first elastic member and the thickness $t_2$ of said second elastic member satisfy a condition $t_1 \leq t_2$.

3. A variable-focus optical element according to claim 2, wherein the sum of the thickness $t_1$ of said first elastic member and the thickness $t_2$ of said second elastic member satisfies a condition $2 \text{ mm} \leq t_1 + t_2 \leq 30 \text{ mm}$.

4. A variable-focus optical element according to claim 1, wherein the thickness $t_1$ and elastic modulus $E_1$ of said first elastic member and the thickness $t_2$ and elastic modulus $E_2$ of said second elastic member satisfy a condition $5 < E_1 t_1 / E_2 t_2 < 100$.

5. A variable-focus optical element according to claim 1, wherein the elastic modulus $E_2$ of said second elastic member is selected within a range from $10^2$ to $10^7 \text{N/m}^2$.

6. A variable-focus optical element according to claim 5, wherein the elastic modulus $E_2$ of said second elastic member is selected within a range from $10^3$ to $10^6 \text{N/m}^2$.

7. A variable-focus optical element according to claim 1, wherein said first elastic member has a curved surface in the initial state thereof.

8. A variable-focus optical element according to claim 1, wherein said deforming means is adapted to apply a positive or negative pressure to said elastic members in the direction of the optical axis.

9. A variable-focus optical element according to claim 1, wherein said deforming means is adapted to apply a positive or negative pressure to said elastic members in a direction substantially perpendicular to the optical axis.

10. A variable-focus optical element according to claim 1, wherein the refractive indexes of said elastic members are equal to each other.

11. A variable-focus optical element comprising:
    first and second elastic members laminated in the direction of an optical axis, the elastic modulus of said first elastic member being larger than that of said second elastic member;
    an aperture plate maintained in contact with said first elastic member;

a support member maintained in contact with a side, opposed to said first elastic member, of said second elastic member; and deforming means for displacing at least one of said aperture plate and said support member in the direction of said optical axis.

12. A variable-focus optical element according to claim 11, wherein said aperture plate is positioned at a side, opposed to said second elastic member, of said first elastic member.

13. A variable-focus optical element according to claim 11, wherein said aperture plate is positioned at a side, facing said second elastic member, of said first elastic member.

14. A variable-focus optical element according to claim 11, wherein the refractive indexes of said elastic members are equal to each other.

15. A variable-focus optical element comprising:

first, second and third elastic members laminated in succession in the direction of an optical axis, the elastic modulus of said first and third elastic members being larger than that of said second elastic member; and deforming means for deforming said plural elastic members to cause the surfaces of said first and third elastic members to protrude or retract from determined apertures.

16. A variable-focus optical element according to claim 15, wherein the refractive indexes of said elastic members are equal to each other.

17. A focus detecting device comprising:

a variable-focus optical element;

an image sensor positioned at an image plane of a determined imaging optical system or at an optically equivalent position thereto;

sharpness detecting means for detecting the sharpness of image from image information obtained from said image sensor;

refractive power controlling means for controlling said variable-focus optical element according to an electrical signal to vary the refractive power of said optical element; and focus state detecting means for detecting the focus state of the image on said image sensor from plural values of a sharpness obtained corresponding to plural values of refractive power of said variable-focus optical element;

wherein said variable-focus optical element comprises:

plural elastic members laminated in the direction of an optical axis; and deforming means for deforming said plural elastic members to cause a surface thereof to protrude or retract from a determined aperture, the elastic modulus of a first elastic member positioned at the protruding or retracting side of said plural elastic members being larger than that of a second elastic member neighboring said first elastic member.

18. A focus detecting device according to claim 14, wherein the refractive indexes of said elastic members are equal to each other.

19. A focus detecting device comprising:

an image-sensor;

means for forming an image of an object on said image sensor, said image forming means including a variable-refracting power element made of a transparent elastic member; and means for varying the refracting power of said element by changing the shape of said elastic member to vary a focus state of the image on said image sensor for a period t at an interval T, wherein $t<T$, after the image of the object on said image sensor has fallen into an in-focus state so as to discriminate if the image on said image sensor is presently in the in-focus state by detecting a state of change of the image on said image sensor in the period t.

20. A focus detecting device according to claim 19, wherein said element consists of plural elastic members laminated in the direction of an optical axis, and at least two of said elastic members have different elastic moduli from each other.

21. A focus detecting device according to claim 20, wherein the refractive indexes of said elastic members are equal to each other.

* * * * *

UNITED STATES PATENT AND TRADEMARK OFFICE
CERTIFICATE OF CORRECTION

PATENT NO. : 4,802,746
DATED : February 7, 1989
INVENTOR(S) : Baba, et al.

It is certified that error appears in the above-identified patent and that said Letters Patent is hereby corrected as shown below:

COLUMN 1
Line 64, change "is" to --in--.

COLUMN 5
Line 27, change "form" to --from--.

COLUMN 6
Line 45, change "containign" to --containing--.

COLUMN 8
Line 62, change "wihch" to --which--.

COLUMN 9
Line 66, change "tign" to --ting--.

COLUMN 10
Line 63, change "P4 21 P3 to --P4 < P3--.

COLUMN 12
Line 14, change "of" (second occurrence), to --to--.

UNITED STATES PATENT AND TRADEMARK OFFICE
CERTIFICATE OF CORRECTION

PATENT NO. : 4,802,746

DATED : February 7, 1989

INVENTOR(S) : Baba, et al.

It is certified that error appears in the above-identified patent and that said Letters Patent is hereby corrected as shown below:

COLUMN 13
Line 17, change "inawer" to --the--.

COLUMN 16
Line 17, change "claim 14," to --claim 17,--; and
Line 21, change "image-sensor;" to --image sensor;--.

Signed and Sealed this

Thirteenth Day of February, 1990

Attest:

JEFFREY M. SAMUELS

*Attesting Officer*  *Acting Commissioner of Patents and Trademarks*